United States Patent [19]
Brownlow

[11] Patent Number: 5,787,213
[45] Date of Patent: Jul. 28, 1998

[54] METHOD AND APPARATUS FOR WRITING BRAGG GRATINGS ON STRAINED OPTICAL FIBERS

[75] Inventor: Darryl Leneir Brownlow, Bridgewater, N.J.

[73] Assignee: Lucent Technologies, Murray Hill, N.J.

[21] Appl. No.: 675,027

[22] Filed: Jul. 3, 1996

[51] Int. Cl.[6] .................................................. G02B 6/26
[52] U.S. Cl. ........................... 385/37; 385/147; 359/900
[58] Field of Search ...................... 385/37, 147; 359/900

[56] References Cited

U.S. PATENT DOCUMENTS 5,061,032  10/1991  Meltz et al. ............................... 385/37

OTHER PUBLICATIONS

J.B. Murgatroyd, "The Strength of Glass Fibres. Part II. The Effect of Heat Treatment on Strength", Journal of the Society of Glass Technology, pp. 388–405, (1944).

M.J. Matthewson et al., "Strength Measurement of Optical Fibers by Bending", J. Am. Ceram. Soc. 69, [11], pp. 815–821, (1986).

P.W. France, et al., "Liquid Nitrogen Strengths of Coated Optical Glass Fibres", Journal of Materials Science 15, pp. 825–830, (1980).

P.W. France, et al., "Strength and Fatigue of Multicomponent Optical Glass Fibres", Journal of Materials Science, 18, pp. 785–792, (1983).

*Primary Examiner*—John Ngo

[57] ABSTRACT

In accordance with the present invention, gratings are written on an optical fiber while the fiber is under a controlled amount of strain provided by two-point bending. When the strain is relaxed, the regions of perturbation become narrower as the fiber contracts and the spacing becomes smaller. The advantage of two-point bending as compared with tension is that the strain is precisely controllable and reproducible.

8 Claims, 2 Drawing Sheets

METHOD AND APPARATUS FOR WRITING BRAGG GRATINGS ON STRAINED OPTICAL FIBERS

FIELD OF THE INVENTION

This invention relates to a method for writing reflective Bragg gratings on optical fiber and, in particular, to a method and associated apparatus for writing gratings on strained fiber.

BACKGROUND OF THE INVENTION

Optical fibers are key components in modern telecommunications. Optical fibers are thin strands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Light rays which infringe upon the core at an angle less than a critical acceptance angle undergo total internal reflection within the fiber core. These rays are guided along the axis of the fiber with minimum attenuation. Typical optical fibers are made of high purity silica with minor concentrations of dopants to control the index of refraction.

A typical optical fiber communications system comprises a source of optical input signals, a length of optical fiber coupled to the source and a receiver for optical signals coupled to the fiber. In multiwavelength systems a plurality of nodes are provided along the fiber for adding or dropping wavelength channels.

Optical fiber Bragg gratings are particularly useful in multiwavelength systems. Fiber Bragg gratings are regions of periodic refractive index perturbation in the optical fiber (typically in the core) which reflect particular wavelengths. Such devices provide spectral selectivity. They are employed in channel selecting apparatus such as multiplexers at the nodes for adding or dropping selected wavelength channels.

It is highly convenient that Bragg gratings can be written directly onto an appropriately doped fiber. If the fiber is doped with a photosensitive material such as Germania, index perturbations can be written directly onto the fiber by exposing periodic portions of the fiber to high intensity ultraviolet light (UV light) as from an Excimer laser. The periodic regions can be defined by a spatial mask, a phase mask, or by the variation of an interference pattern along the fiber length.

Each of these techniques of grating formation has spatial limitations—both in the minimum width of the perturbed region and in the minimum spacing between successive perturbed regions. These limitations are reflected in a minimum bandwidth of the filter and a minimum wavelength that can be filtered. There is a need for filters which can filter at lower wavelengths and at narrower bandwidths than can be provided using conventional techniques for writing gratings.

SUMMARY OF THE INVENTION

In accordance with the present invention, gratings are written on an optical fiber while the fiber is under a controlled amount of strain provided by two-point bending. When the strain is relaxed, the regions of perturbation become narrower as the fiber contracts and the spacing becomes smaller. The advantage of two-point bending as compared with tension is that the strain is precisely controllable and reproducible.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for the purpose of illustrating the concepts of the invention and, except for graphical illustrations, are not to scale.

DETAILED DESCRIPTION

Figure 1:
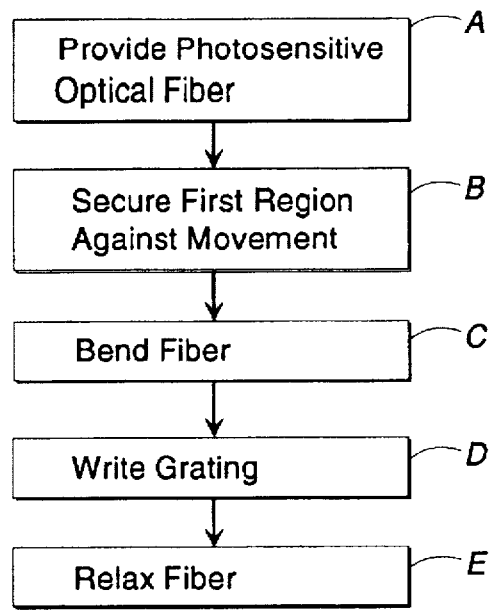
FIG. 1 is a block diagram illustrating the method of making a fiber Bragg grating in accordance with the invention.

Referring to the drawings, FIG. 1 is a flow diagram illustrating the process for making a fiber Bragg grating in accordance with the invention. As shown in block A, the first step is providing a length of photosensitive optical fiber. Preferably the fiber has a photosensitive core produced by doping the core with Germania up to 3% or more. The fiber is preferably uncoated or coated with a polymer which has low absorbence of UV light.

Figure 3A:
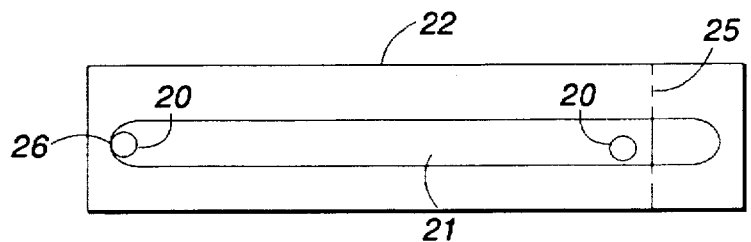
FIGS. 3A and 3B are bottom views of alternative forms of the clamp plate in FIG. 2.
Figure 3B:
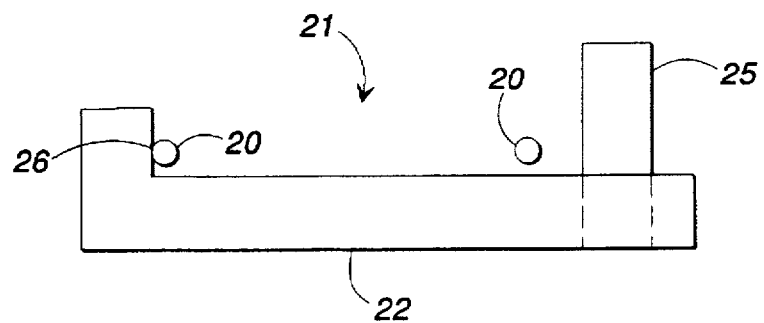
Figure 2:
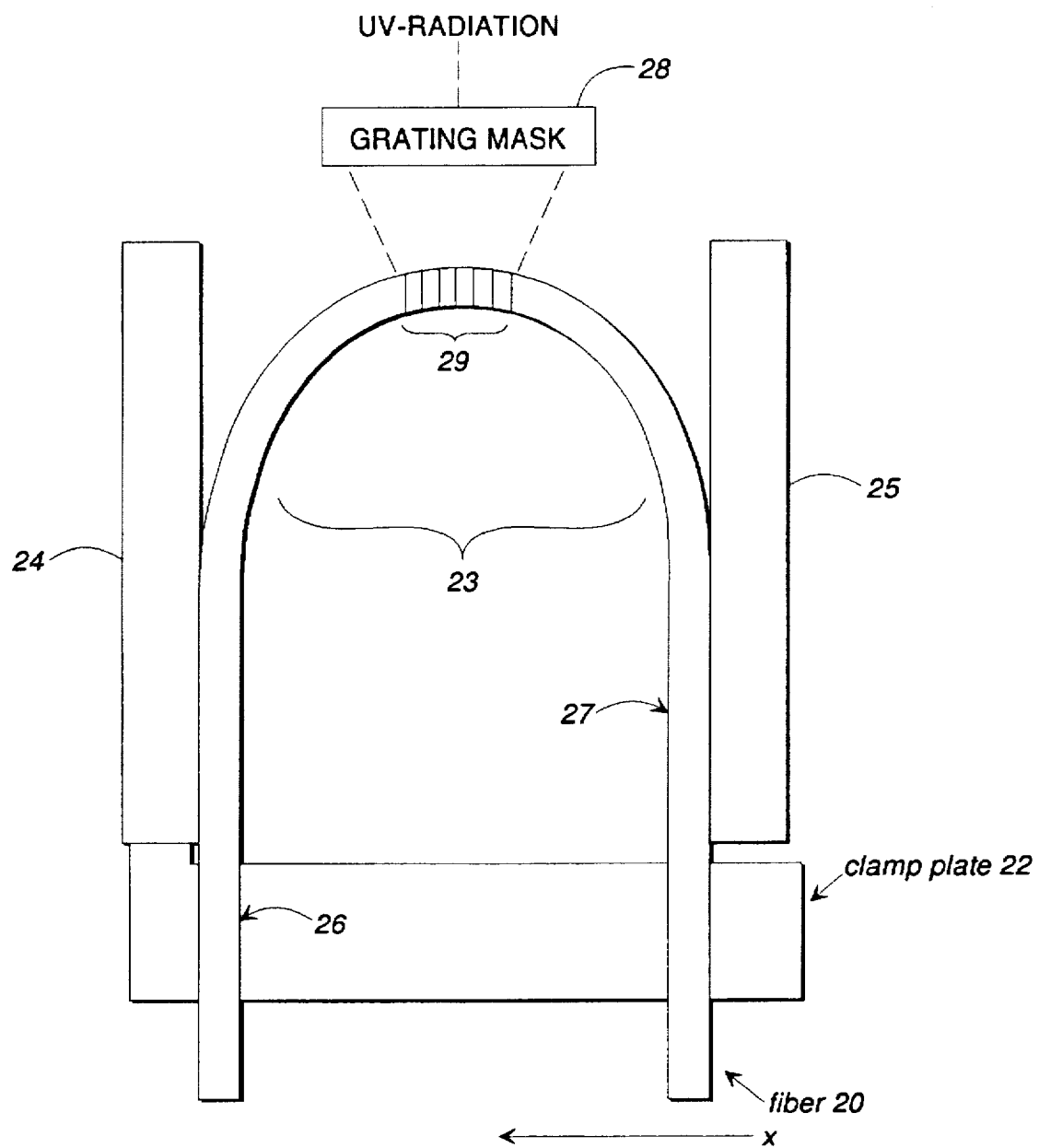
FIG. 2 is a schematic view of apparatus useful in practicing the method of FIG. 1.

The next step shown in block B is to secure a first region of the fiber against lateral movement. FIG. 2 illustrates a preferred apparatus useful in practicing the invention wherein a loop of fiber 20 has been inserted into a slot or groove 21 in a clamp plate 22. The slot and groove are best shown in the bottom views of FIGS. 3A and 3B. As can be seen region 26 of the fiber is secured against lateral movement by contact with the slot or groove.

The radius of curvature r of the bent region 23 of the loop is controlled by a pair of planar face plates 24, 25, one of which (e.g. 24) can be fixed, the other of which (25) can be controllably moved in the lateral (x) direction as by a computer-controlled stepper motor (not shown). In this apparatus, the fiber at region 26 is secured against lateral movement by abutment against the left wall of slot 21 and face plate 24.

As shown in block C, the third step is to bend the fiber by moving a second region of the fiber toward the first, thereby providing strain in the bent region. Strain, as referred to herein, is the percentage of increased length due to an applied stress. In FIG. 2, the second region 27 is moved generally toward the first region by movement of face plate 25, producing bent region 23. Since face plate 25 is controllably movable, the radius of curvature of bent region 23 can be controlled, thereby controlling the amount of strain in region 23. In typical applications the fiber should be bent to produce 6 percent strain or higher.

Once the desired amount of strain is achieved, the next step (block D) is to write a Bragg grating on the fiber in the strained region. This can be accomplished by any one of several known techniques for subjecting the fiber to a periodic pattern of UV light. Such techniques include exposure through a spatial mask or a phase mask or exposure to interfering beams of UV light. FIG. 2 illustrates exposure through a mask 28 to write a grating 29 in region 23. The exposure produces a periodic or near-periodic series of perturbed index regions in the core along the length of the exposed region.

As a final step shown in block E, the strain is then relaxed, permitting the fiber to contract, thereby reducing the width of the index perturbations and reducing the spacing between successive perturbations. This reduction sharpens the minimum bandwidth of the filter and shifts the minimum wavelength to a shorter wavelength.

Conventional techniques for applying strain to a fiber typically involve wrapping the fiber around mandrils for gripping. In such apparatus the fibers can undergo slippage on the mandrel, leading to non-reproducible results or even fiber damage by the force applied to the wrapping.

In contrast, using the two-point bending technique described herein the stress produced is reproducible, highly controllable and readily calculated. Specifically, the stress S is given by $$S = \frac{1.198 \times d_f \times E(e)}{(D - d_c)}$$

where $d_f$ is the diameter of the fiber, $d_c$ is the diameter of the coating (if any), D is the gap separation between the face plates and $E_{(e)}$ is the strain dependence of the Young's modulus. The strain is proportional to the stress.

In addition to permitting a high degree of control over the strain applied to the fiber, the method and apparatus of the invention readily permit testing of the fiber for flaws. Before gratings are written, the outer polymer coating is removed to expose bare silica glass. Strength limiting flaws may have been produced during removal of the coating. In order to test for such flaws, a skilled practitioner can test the fiber with a manual or automated proofstrain by placing an uncoated section of fiber between the faces of the two-point bender. This test will not break or damage unflawed fiber. It will break flawed fiber, but it saves the time of writing a grating on flawed fiber.

In high power fiber laser and amplifier applications, gratings often have to be spliced into existing fiber optic systems. After writing the grating, the fiber and splice joints can be tested either in a dynamic or static mode.

In the dynamic mode, the strain rate ė is related to the strain e, by the relationship:

$$e = C\dot{e}^{(1/(n+1))}$$

where C and n are material constants used in measuring reliability (n≈20 for silica).

In the static mode, the time to failure $t_f$ of the tested part is related to the applied stress s (or strain e) by the expression:

$$t_f = k \times (1/s)^n$$

where k and n are experimental constants of the optical fiber. In addition, there exists a potential that the static mode can be used to observe pronounced relaxation in the grating after annealing.

Using the static and dynamic mode tests, the reliability of gratings can be investigated by propagating high power laser light through a grating after the grating has been written and while it is still under high strain in the apparatus of FIG. 2. Gratings whose peak wavelengths abnormally shift at high power levels can be rejected. As compared to tension, where gripping concerns and slippage may introduce variables into the testing process, bending is reproducible and less likely to damage the fiber.

The invention can be better understood by consideration of the following examples.

EXAMPLE 1

Writing a Grating

A three inch section of uncoated optical fiber is carefully placed between two parallel faces, one of which is movable and the other fixed. Using a precision stepper motor controller, the optical fiber is placed under high strain by translating the movable face relative to the fixed one. Standard phase mask or interference techniques are applied, in conjunction with UV radiation, to write the grating. Input radiation directed at the strained portion can range between 100 mW (0.1 W) to less than 500 mW (0.5 W), with exposure times on the order of minutes. In the pulsed CW mode, the same results can be accomplished, but with lower power, as the power density or fluence, can be on the order of 100 mJ per square cm per pulse.

EXAMPLE 2

Testing a Grating

In order to test for strength-limiting flaws before writing the grating (or even to orient the fiber for UV light exposure) the practitioner can apply a manual proofstrain by orienting uncoated sections of the fiber in and out of the parallel faces. After writing the grating, he can apply a manual or automated proofstrain to test for damaged sites. These tests can also be applied in situ during the writing.

It is to be understood that the above-described embodiments are illustrative of only a few of the many possible specific embodiments which can represent applications of the principles of the invention. For example, since the application of high strain can shift the frequency of Bragg reflection, this technique provides an excellent way of introducing a controlled and reproducible chirp into a waveguiding structure. Since the strain is precisely controllable, the introduced chirp and peak wavelength are precisely controllable. Numerous and varied other arrangements can be made by those skilled in the art without departing from the spirit and scope of the invention.

I claim:

1. A method for writing a Bragg grating in an optical fiber comprising the steps of:

providing a length of photosensitive optical fiber;

bending said fiber by securing a first region of said fiber against lateral movement and moving a planar surface against a second region of said fiber toward said first region, producing a bent region between said first and second region subject to at least 6% strain;

writing said Bragg grating on said bent region by exposing said region to a pattern of ultraviolet light; and relaxing said fiber.

2. The method of claim 1 wherein said fiber is disposed within a slot or groove, said first region being secured against lateral movement by abutting one end of said slot or groove.

3. The method of claim 1 further including the step of securing said second region against lateral movement when a desired bend is achieved.

4. The method of claim 1 wherein said Bragg grating is written on said bent region by exposing said region to ultraviolet light through a mask.

5. The method of claim 1 further comprising the step of testing the strength of said bent fiber prior to writing said grating.

6. The method of claim 1 further comprising the step of testing the strength of said fiber during or after writing said grating.

7. Apparatus for writing a Bragg grating on an optical fiber comprising:

a clamping plate defining a slot or groove for insertion of a loop of fiber;

a first face plate transverse to said clamping plate, said clamping plate and said first face restraining a first region of said fiber against lateral movement;

a second face plate transverse to said clamping plate, said second face plate being controllably movable for moving a second region of said fiber toward said first region, thereby producing a bent region in said fiber; and a source of ultraviolet light for writing a Bragg grating in said bent region.

8. The apparatus of claim 7 further comprising a mask disposed between said source and said bent region.

* * * * *